Aug. 14, 1956 A. FREEMAN 2,758,698
INDEX DEVICES FOR USE IN CONVEYOR SYSTEMS
Filed Jan. 16, 1953 3 Sheets-Sheet 1

INVENTOR
Alfred Freeman
BY

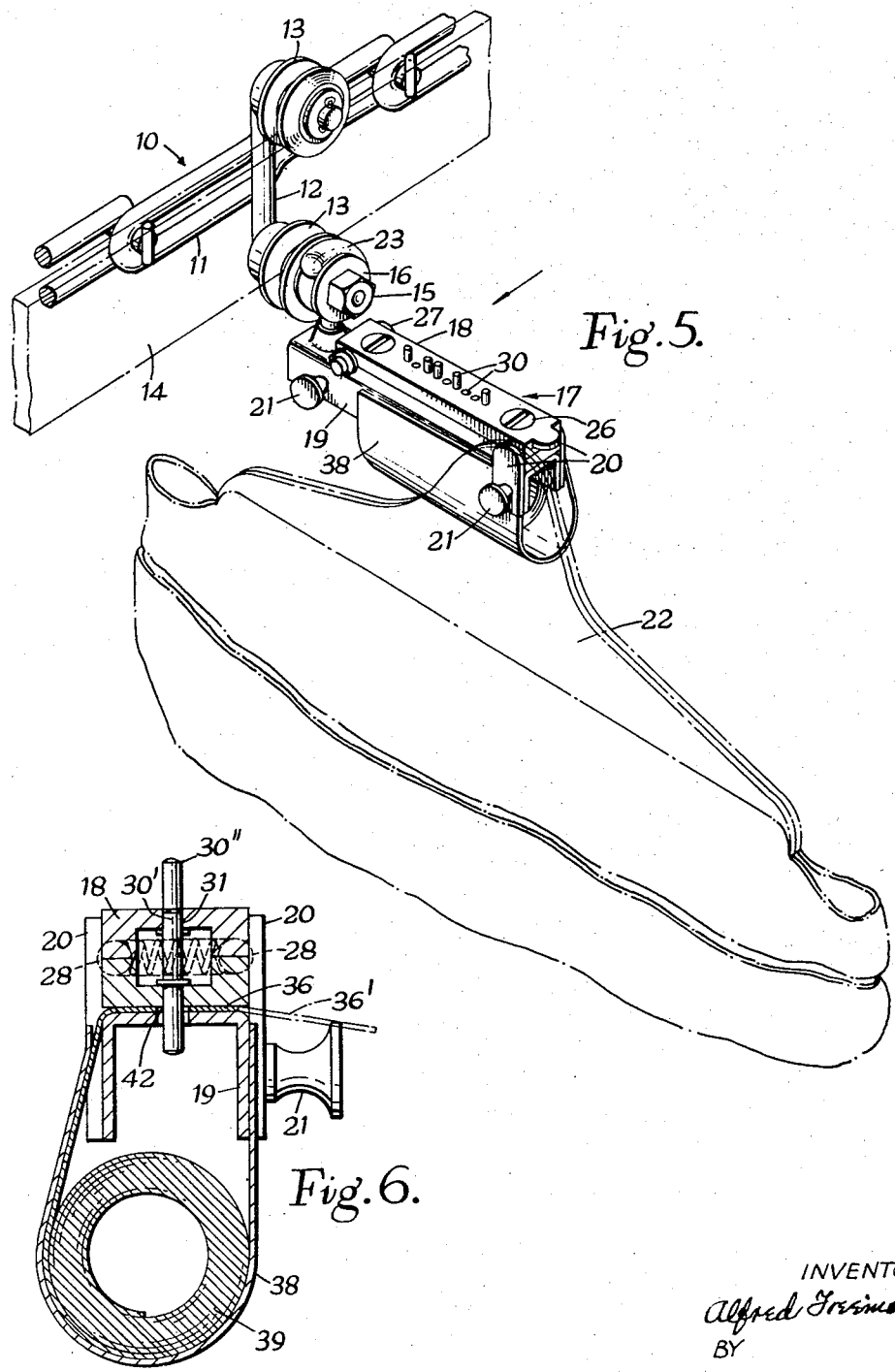

United States Patent Office

2,758,698
Patented Aug. 14, 1956

2,758,698

INDEX DEVICES FOR USE IN CONVEYOR SYSTEMS

Alfred Freeman, Isham, near Kettering, England

Application January 16, 1953, Serial No. 331,630

Claims priority, application Great Britain January 16, 1952

8 Claims. (Cl. 198—38)

The present invention is concerned with conveyor systems by means of which goods can be transported and delivered or dealt with automatically at a predetermined place along the system, as selected by the loader or chosen automatically.

In the specification of patent application Serial No. 294,400, entitled "Improvements in Conveyor Systems," are described various forms and features of such conveyor systems, whereby goods transported on the systems can be automatically discharged or otherwise dealt with at pre-selected stations en route.

The present invention is concerned with conveyor systems of this and a like character and which essentially comprise a conveyor for transporting goods, a plurality of index devices which are permanently or detachably secured to the conveyor in association with particular goods or batches of such goods and each comprise a set of elements which can be "projected" or "retracted" to identify a particular combination, and a plurality of reader mechanisms which are sited at various positions along the conveyor and which are each responsive to a particular index setting so as to select an index device exhibiting that combination and accordingly to trip means acting on the goods associated with that particular device. Hereinafter conveyor systems of this character are referred to as being "of the character set forth."

In some instances, moreover, the systems of the character set forth include at least one mechanism for producing the different combinations set on the index devices. This mechanism, termed an index-setting mechanism, may be disposed at, say, a loading station and serve to set a selected combination on a passing index device; one particular form of such an index-setting mechanism is described, by way of example in application No. 294,400.

In other cases no stationary index-setting mechanism is employed, and the adjustable elements of the index devices are set to the desired combination of projections and retractions by a contrivance which travels with the index device, e. g. a punched card.

Again, witness an example described in this latter application, the index device can be detachable from the conveyor with the goods or work, whilst in other cases the index device can be a permanent fixture on the conveyor, which may conveniently be of chain form.

The present invention is concerned with the index devices used in conveyor systems such as those described in the aforementioned applications, in fact in any conveyor systems of the character set forth, and provides an index device comprising a housing carrying a plurality of spaced index elements each of which passes in guided fashion through holes in opposed walls of said housing and is capable of axial sliding movement in said holes, whereby each element can be set in alternative positions in which it is, respectively, projected outwardly from one wall of the housing or retracted into or towards this wall. By virtue of this arrangement each of the various elements of the device can be set into a "projected" or "retracted" condition so as to correlate it to a particular reader mechanism, which will then select it as it passes for performance of some operation on the goods (e. g. discharge thereof from the conveyor) associated with this index device.

The index devices provided by the present invention are capable, as indeed are the conveyor systems in which they are employed, of application to many and varied uses, e. g. the sorting of goods, the series manufacture of articles in successive operating stages, the assembly of components from different despatch points, and so on.

Moreover these index devices, which are typified by their relative simplicity and reliability, can be employed in different ways according to the function of the particular conveyor system concerned. Hence for instance they may be permanently attached to the conveyor in association with a carrier (fixed to or detachable from the conveyor) for goods or work, or again they may be arranged for detachable mounting on this conveyor as and when required, and in this latter event may be permanently or detachably secured to, or independent of, a carrier for the goods or work.

In a very suitable and simple construction the housing of each index device has an internal chamber into which the various guide holes open, and each index element has a stop collar or flange intermediate its ends arranged to abut one of the two opposite walls of the chamber to determine the projected or retracted position of the element concerned.

Further, the housing will advantageously be externally in the form of a bar which is secured, or adapted to be attached, to the conveyor so as to extend laterally and horizontally therefrom, and the index elements are in the form of a set of aligned pins adjustably mounted in vertical status in said bar.

In many cases, as for example when the elements of the respective index devices are set by a stationary setting mechanism, it will be required to provide each of them with means whereby the elements can be unlocked for such setting and then relocked when the required combination of projections and retractions has been applied. Suitable locking and re-locking means are hereinafter set forth.

In other arrangements where no specific stationary index setting mechanism is employed and the index device has its own combination-controlling means travelling therewith, the housing of the device may be mounted on a support for an apertured element applied from the exterior against the opposite wall of the housing to determine the positions of said elements.

Illustrated forms of index device according to this invention and the manner of their use, are depicted in the accompanying drawings in which:

Figure 5 is a perspective view illustrating a modified form of the index device applied to another use.

Figure 6 is an enlarged vertical cross section through the index device appearing in Figure 5.

The index device forming the subject of Figures 1 to 4 is permanently secured to a circulating conveyor chain, and the individual elements of this device are arranged to be set by an index setting mechanism at a specific point in this circuit, and then locked in this set condition until re-set at some subsequent stage in the use of the device.

Figure 1:
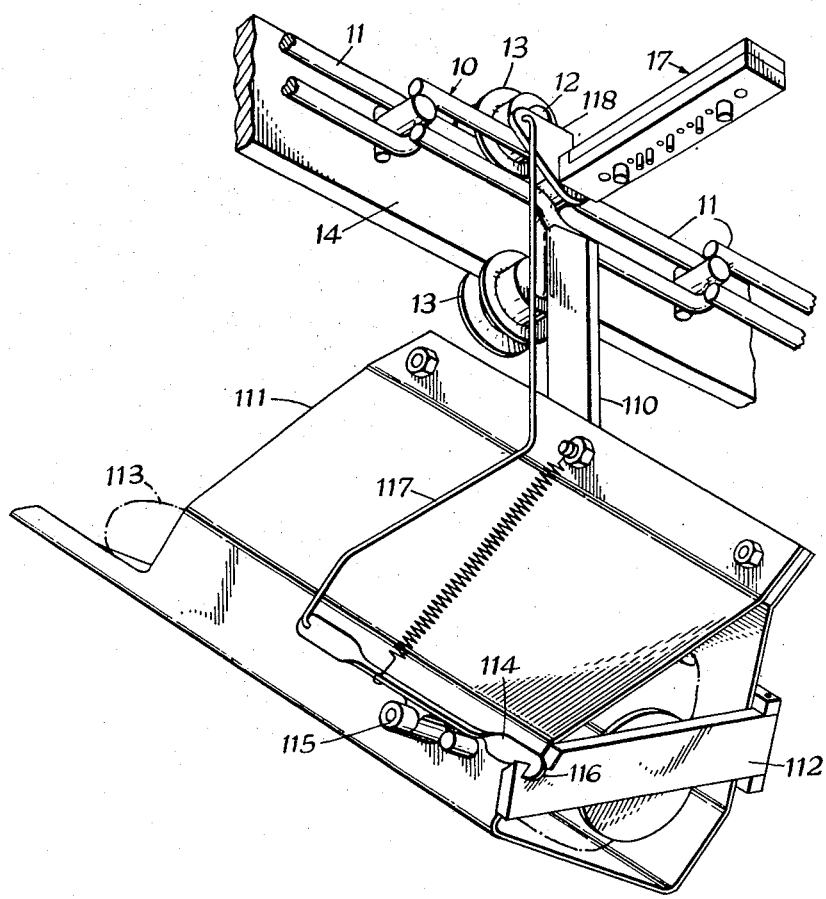
Figure 1 is a perspective view of a detail of a conveyor system incorporating one embodiment of index device permanently secured to the conveyor chain.
Figure 2:
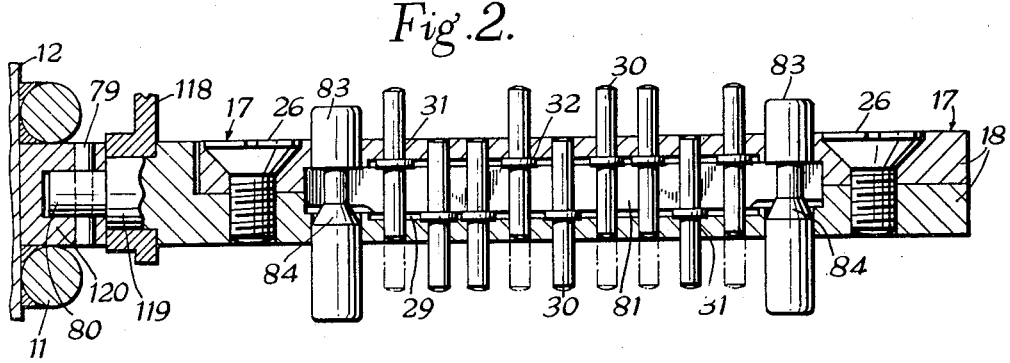
Fig. 2 is a coss section through the actual index device according to Figure 1.
Figure 3:
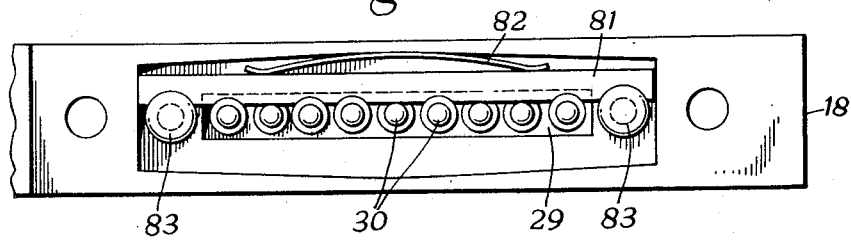
Figure 3 is a plan view of the same index device, but with part thereof removed.
Figure 4:
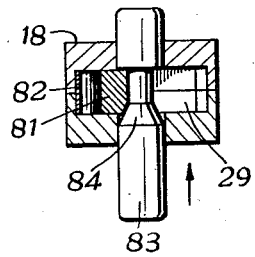
Figure 4 is a vertical cross section through the complete device, this view being at right angles to that of Figure 2.

In Figure 1 the conveyor is shown as made up of a chain, generally denoted 10, which comprises a series of articulated links 11. Thus, each link has a cross piece 12 which is bent around at its ends to receive runners in the form of rollers 13 which are arranged to travel along a guide rail or bar 14.

It is assumed that the conveyor is applied to use in the sorting of lasts, as described in patent application No. 294,400, and for this reason has a depending bar 110 secured to the cross piece 12 and carrying a last holder 111 which is an open-ended casing of generally triangular shape transverse to its length. In addition, this last holder is pivotally furnished with a latch 112 which extends across the open lower end thereof to serve as a swing bottom to the holder and a retaining barrier for a last, here denoted 113, inserted in the holder 111. The latch 112 is normally retained in position by a trip mechanism comprising a lever 114 fulcrummed at 115 on the side of the holder and having a nose 116 serving as a catch to releasably hold the latch 112.

Attached to the opposite end of the lever 114 is an angled link 117 which is articulated at its upper end to a trip member 118 which is rotatably disposed on a cylindrical stub end portion 119 of an index device generally denoted 17. This index device has a further spigot 80 at this end, this being secured by a pin 79 in a block 120 secured to the cross piece 12, whereby the index device 17 stands out laterally and horizontally from the circulating conveyor chain.

The arrangement therefore is that when this particular last holder, passing along the circuit, reaches a discharge mechanism which incoporates a reader mechanism correlated to the particular setting of the index device 17, the trip member 118 will be operated by the discharge mechanism so that it pivots about the cylindrical stub end 119, thus rocking lever 114 to release the latch 112 and so cause the last 113 to be ejected at this point, all as described in patent application No. 294,400.

The housing of the index device 17 seen in Figures 1 to 4 is in the form of a rectangular bar made up of two superimposed halves 18 which are interconnected by screws 26. These halves or plates 18 define between them an internal chamber 29 in which move the central parts of the various locking elements 30 which are disposed in spaced alignment along the length of the composite bar 18. As will be observed, each index element 30 is of simple cylindrical form and is slidable, in guided fashion, in corresponding apertures 31 provided in the upper and lower plates 18. As will be observed, each index element 30 is of simple cylindrical form and is slidable, in guided fashion, in corresponding apertures 31 provided in the upper and lower plates 18, i. e. in opposite walls of the housing. Moreover, each element 30 is provided intermediate its ends with a collar 32 which is capable of abutment against the aforesaid opposed walls of the housing so as to limit the travel of the locking element concerned.

Additionally mounted in the chamber 29 is a locking bar 81 which is adapted to cooperate with the collars 32 on the various elements 30 to retain these latter in projected or retracted position, as the case may be. The bar 81 is normally urged into its locking position by a leaf spring 82, arranged in the chamber, but is movable away from the elements 30, when it is required to release these for setting purposes, by means of a locking and unlocking plunger 83 arranged one adjacent each end of the chamber 29 as is clearly seen from Figures 2 and 4. Each of the locking plungers 83 is waisted, at its central part, by an annular groove having a lower face 84 of frusto conical formation and an upper face which is perpendicular to the axis of the element. Hence when the unlocking and re-locking plungers 83 meet an abutment at the or a setting station during the travel of the index device through this station, which abutment will conveniently be of bevelled form, these plungers will travel up the ramp or cam surface so provided and will be raised relatively to the body of the index device 17, thus pushing back the locking bar 81 against the action of its spring 82 and releasing the elements 30 for setting as required.

After such setting a similarly chamfered abutment, arranged in the path of the index bar is arranged to depress each locking plunger 83 from above, thereby permitting the return of the locking bar 81 to grip and set the index elements in the selected combination, and this will be retained during the whole of the travel of the index device until a fresh unlocking situation is encountered.

In the form of the invention illustrated in Figures 5 and 6, the locking device there illustrated is detachable from the conveyor and is itself mounted on a support for a work holder or carrier, the arrangement being that the index device is to be mounted with a work carrier attached thereto on a passing conveyor chain, as and when required by an operative who acts the index device. Thus when it reaches the next station, as determined by this setting, the index device, the support therefor, and the work carrier, are all rejected together and taken up by the next operative, dealt with, and passed on as before. Furthermore, this particular arrangement involves the use of a punched card control.

In this form of the invention, equivalent parts have been denoted with the same reference characters to those used in the preceding example.

In this present instance the composite bar 18 of the index device is mounted on an inverted channel piece 19 to which a work carrier can be attached. Thus the channel piece 19 is provided with upstanding lugs 20 at one end, one of these lugs and the other end of the channel piece, carrying studs 21 for attachment of the upper end of the work carrier which, in this particular instance, is represented by a bag 22 seen in phantom in Figure 5. The bag 22 is here indicated as mounted on the outer stud 21, but could alternatively be secured on the inner stud or again a form of bag can be used which is adapted to be attached to both these studs. Further it is to be appreciated that work holders other than bags can be carried by the channel piece 19.

The lower lateral limb of the cross piece 12 of the corresponding conveyor chain link is extended somewhat and has secured thereto, by means of a nut 15, an outer and non-rotatable roller 16. This latter is intended to form a mounting for the index device 17. Thus the piece 19 has, at its inner end, an upstanding hook 23 which is shaped so that it can be placed by the operative in the groove in the roller 16 so as detachably to mount the index device, with its work carrier, on the conveyor chain, as seen in Figure 5.

The index bar 17, made up of the superimposed halves 18, is hinged at 27 to an ear on the channel piece 19 to enable it to be raised for the insertion of an index setting means (to be referred to later) and, at its opposite and outer end, has spring pressed catch balls 28 cooperating with the lugs 20 to enable it to be snapped down into working position.

The index elements 30 themselves are of the same form and disposition of those described in the preceding embodiment, but the means for holding them set in an appropriate combination of projections and retractions is here of different form. Thus, there is no locking means provided in the present example, the index elements 30 being loosely slidable in their apertures 31 at all times and a punched card, which travels with the index device, being used to determine the particular set combination of the elements. This card, which is designated 36 and is conveniently of cardboard or stiff paper, is sandwiched between the index bar 18 and the top limb of channel piece 19, and holes 42 punched in this card allow the appropriate index elements (as 30') to pass therethrough, and therefore be retracted relatively to the index bar, whilst the other elements (as 30") finding no accepting hole are projected from the bar.

The punched card 36 conveniently forms one of a series of interconnected such cards which, in use, are disposed in roll 39, which is located in a scroll 38 secured to the channel piece 19. When resetting the index device for forwarding the work to the next destination, the operative advances the roll 39 so that the next punched card becomes effective, the last-used card then being brought into the position 36' indicated in Figure 6, when it can be detached for use as a work ticket or for some other purpose or be left to travel with the work to the ultimate destination.

Although in connection with the two examples illustrated, reference has been made to specific uses of the invention, it is to be emphasized that these are particular instances only and that the range of potential uses is most varied.

Again, the index devices are capable of use with varied forms of reader or selector mechanisms and different forms of index setting mechanisms. Thus, for instance, this index-setting mechanism can be of the cam drum character described in application No 294,400, or in the form of a key which is displaceable into different positions perpendicularly to the direction of travel of the index devices. Here the wards of the key bit, which are in fixed relation, represents the various cam edges, and different setting combinations are produced by advancing or retracting the key.

It is also to be appreciated that the action of the reader or selector mechanisms concerned is not necessarily to produce a discharge of the goods from the conveyor. An alternative arrangement exists where the reader or selector is used to trigger the operation of, say, a tool for operation on work carried by the conveyor at the relevant part.

What I claim then is:

1. For a conveyor system of the character set forth, an index device comprising a housing, a plurality of spaced index elements passing slidably therethrough, each of said index elements being formed with an abutment for holding it captive in said housing, and means for releasably holding each of said index elements alternatively in a projected or retracted position relatively to the housing.

2. For a conveyor system of the character set forth, an index device comprising a hollow housing, a plurality of spaced index elements slidably guided in holes in opposite walls of said housing, said index elements each being in the form of a pin having, intermediate its ends and in the hollow interior of said housing, a flange of greater peripheral size than said holes, therbey to hold the pins captive in said housing, and movable means for holding each of said pins alternatively in a projected or retracted position, relatively to the housing, by mechanical abutment therewith.

3. For a conveyor system of the character set forth, an index device comprising a housing, a plurality of index pins in spaced horizontal alignment slidably carried in the body of said housing for vertical adjustment relatively to this body, each of said index pins being formed with an abutment for holding it captive in said housing, and means for releasably holding each of said index pins alternatively in a projected or retracted position relatively to the housing.

4. For a conveyor system of the character set forth, an index device comprising a housing and a plurality of spaced index elements passing slidably therethrough, said index elements each having abutment means for defining the projected and retracted positions of this element relatively to the housing, and means carried by said housing and operable from the exterior of the latter for locking the index elements in adjusted positions.

5. For a conveyor system of the character set forth, an index device comprising a hollow housing, a plurality of spaced index elements slidably guided in holes in opposite walls of said housing, said index elements each being in the form of a cylindrical pin having, intermediate its ends and in the hollow interior of said housing a flange to delimit the projected and retracted positions of this element relatively to the housing by abutment with the respective wall of the housing, a spring-biassed bar accommodated in the hollow interior of said housing and cooperating with the flanges on the index pins to retain each of the latter in a projected or retracted position, and wedge means carried by said housing for moving said bar to release said index pins for setting.

6. An index device according to claim 5, in which the wedge means comprise a pair of spaced plungers slidably mounted in the housing and each having a bevelled surface which cooperates with said locking bar to relieve the pressure thereof against the locking elements when the plunger concerned is shifted axially.

7. A conveyor system comprising a conveyor, index devices adapted to travel with the conveyor and identify associated goods on latter, each such index device comprising a housing, a plurality of pins individually slidable in said housing into a projected or retracted position relatively to the housing, means for releasably holding the assembly of pins set into a selected combination of such projections and retractions, and reader mechanisms in the path of said index devices travelling with the conveyor and each adapted for movement by a specific combination of pin projections and retractions in a passing index device to operate a trip means.

8. In a conveyor system of the character set forth, a device for selecting the operative combination of projections and retractions of the index elements, such device comprising a housing, a plurality of aligned pins individually slidable in said housing into a projected or retracted position relatively to the housing, each of said pins having abutment means to hold it captive in the housing, and a mount for a punched card hingedly connected to said housing, whereby a punched card inserted between the housing, a mount with its perforations in register wtih corresponding pins in the housing determines the pins of the set which will be retracted in the combination.

References Cited in the file of this patent

UNITED STATES PATENTS

| | | |
|---|---|---|
| 1,589,383 | Garcia | June 22, 1926 |
| 2,079,442 | Fuller et al. | May 4, 1937 |
| 2,315,659 | Russell | Apr. 6, 1943 |